United States Patent [19]

Swanson et al.

[11] Patent Number: 4,948,511
[45] Date of Patent: Aug. 14, 1990

[54] METHOD FOR EXTRACTING DISSOLVED ORGANIC POLLUTANTS FROM AQUEOUS STREAMS

[75] Inventors: Gregory R. Swanson, San Diego; Roger R. Argus, Solana Beach, both of Calif.

[73] Assignee: Maxwell Laboratories, Inc., San Diego, Calif.

[21] Appl. No.: 339,020

[22] Filed: Apr. 14, 1989

[51] Int. Cl.$^5$ ............................................. B01D 11/04
[52] U.S. Cl. ...................................... 210/634; 210/909
[58] Field of Search ................. 210/634, 909, 703, 639

[56] References Cited

U.S. PATENT DOCUMENTS

| | | | |
|---|---|---|---|
| 1,955,065 | 4/1934 | Hawley | 210/634 |
| 2,226,532 | 12/1940 | Hawley | 210/634 |
| 4,421,649 | 12/1983 | GiskeHaug et al. | 210/909 X |
| 4,518,502 | 5/1985 | Burns et al. | 210/909 X |
| 4,746,434 | 5/1988 | Grieves et al. | 210/909 X |

*Primary Examiner*—Frank Spear
*Attorney, Agent, or Firm*—Fitch, Even, Tabin & Flannery

[57] ABSTRACT

A method for economically creating useful thermal energy and decontaminating an aqueous stream containing dissolved organic pollutants which may be present in total concentration of 1 or 2 weight percent or as low as even less than 10 ppm. The stream of contaminated water is extracted with a once-through countercurrent stream of substantially water-immiscible, non-polar mixed $C_{10}$ to $C_{20}$ hydrocabons to dissolve and remove organic pollutants and create a treated water stream which meets environmental standardes for re-use or for discharge to a municipal treatment facility or to the environment. The contaminated mixed hydrocarbon stream is transferred to an on-site power or heat-generating facility where it and its contaminants are burned at a temperature of at least about 1000° F. and a residence time of at least about 1 second to oxidize the contaminants and generate useful thermal energy, e.g., by creating steam which is expanded through a turbine to create electrical power via an interconnected electrical generator.

19 Claims, 1 Drawing Sheet

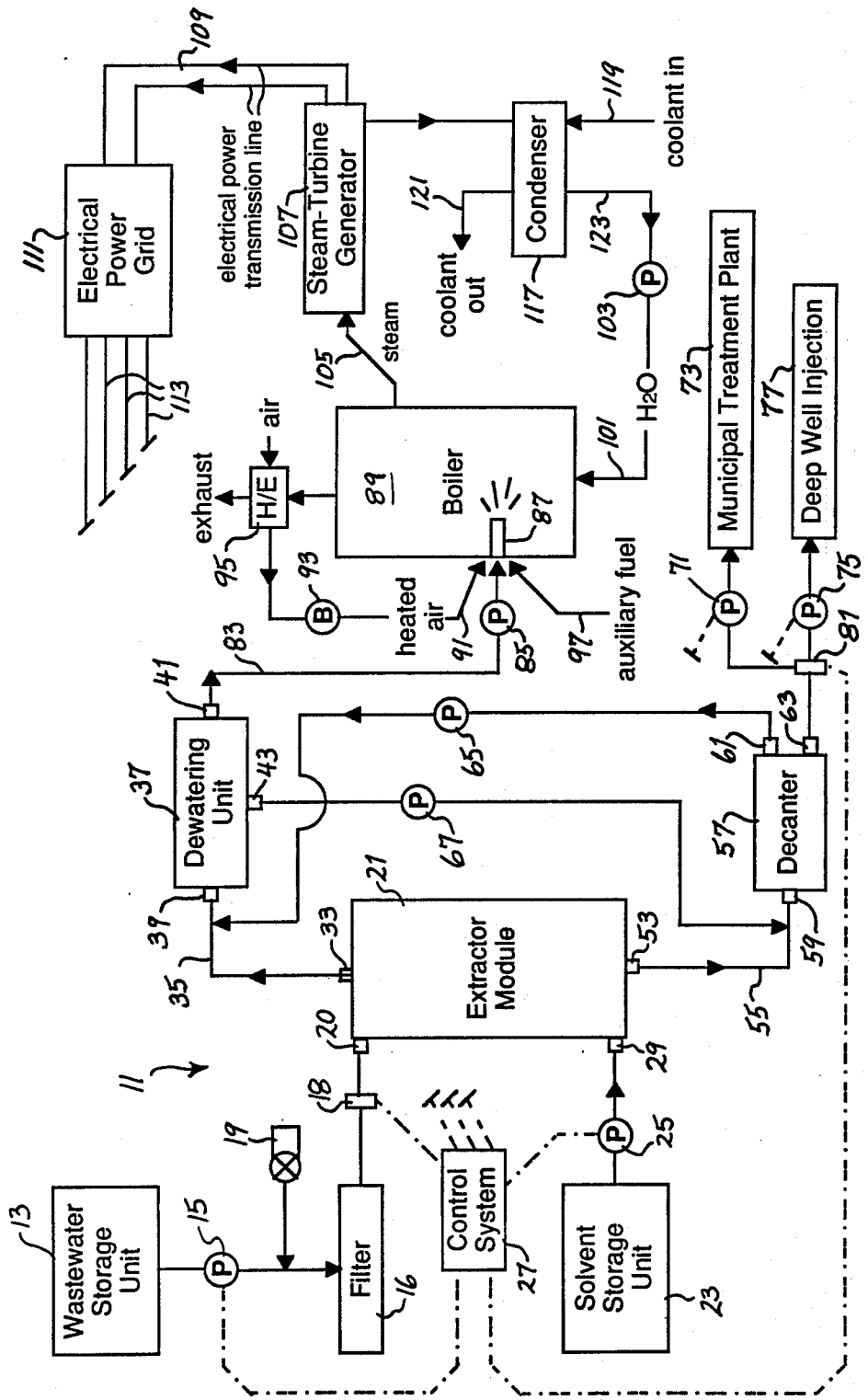

METHOD FOR EXTRACTING DISSOLVED ORGANIC POLLUTANTS FROM AQUEOUS STREAMS

The invention relates to the clean-up of wastewater or process water streams containing dissolved organic pollutants, and more particularly to the efficient and economical extraction of dissolved organic pollutants from an aqueous stream by employing a substantially immiscible and readily available organic solvent which is particularly suitable for use in a coupled system for producing useful thermal energy.

BACKGROUND OF THE INVENTION

Industry has long been concerned with the clean-up, by the removal of dissolved organic pollutants which are toxic in nature, of process water streams and wastewater streams so as to render them suitable for reuse or for discharge either to a municipal treatment plant or to the environment. The concern has grown greater in recent years as the standards for wastewater discharge have become more stringent, particularly in the United States. As a result, there have been significant attempts made to recycle process water streams. Various treatment techniques have been developed over the years attempting to purge such process waters of organic pollutants.

U.S. Pat. No. 4,518,502 to Burns et al., issued May 21, 1985, shows a method for countercurrent extraction of a process water stream using a solvent such as n-pentane which is particularly suitable for the extraction of chlorinated hydrocarbon pesticides, including DDT, chlordane and others. The solvent which dissolves in the process water stream is removed by gas sparging, and the solvent stream is subsequently separated from the pesticides by gas sparging to vaporize the solvent. Other patents, such as U.S. Pat. No. 4,162,902, use steam-stripping to vaporize the solvent from the extract, and steam-stripping has also been taught to remove solvent from the raffinate following such an extraction, as shown in U.S. Pat. No. 3,449,244.

In oil refineries, contaminants which are valuable in catalytic cracking operations are sometimes extracted from sour refinery water as by the use of gas oil, and the phenol-enriched gas oil is then used as a feed for a fluid catalytic cracking unit, as disclosed in U.S. Pat. No. 4,746,434, issued May 24, 1988. Other similar disclosures of such refinery operations exist.

Although solvent extraction has been proposed for removal of organic pollutants from aqueous streams for a number of years, in very many instances the costs of solvent have been too high to be cost-competitive with other competing systems. In many instances, pure solvents are preferred to facilitate solvent recycling; however, because of the relatively high cost of procuring and operating with pure solvents, including providing make-up solvent, such processes have had economic disadvantages. In some instances, the cost of such pure solvents may be sufficiently high that, even when gas sparging is used, the costs are sometimes still not competitive. Heretofore, adsorption of these organic pollutants on activated carbon has been one viable alternative. However, in the United States, the Environmental Protection Agency's more recent regulations render it no longer feasible to dispose of organic pollutant-contaminated spent activated carbon by landfill, thus requiring either the regeneration of the activated carbon extractants, a relatively costly proposition, or the incineration of them, adding significantly to the expense.

Because of the growing interest worldwide in combating pollution and groundwater contamination, this subject remains of important interest and improved methods of treatment which are efficient and which are particularly capable of economical practice continue to be sought. As a result, the search continues for more economical and cost-efficient ways of removing water-soluble organic pollutants from process or wastewater streams, and in this respect, the minimization of both the cost of operating materials and the cost of the extraction plant installation itself is a substantial concern.

SUMMARY OF THE INVENTION

It has been found that an economical and efficient method for extracting dissolved water-soluble contaminants from process or wastewater streams can be carried out by coupling a particular extraction process with a heat or power-generating installation, for example, one for generating steam for electrical power generation or for process heat. As a result of such an arrangement, safe and surprisingly effective extraction of a wide variety of organic contaminants can be carried out by countercurrent extraction of the contaminated aqueous stream, at a ratio of solvent to water flow of less than about 1:5, using a relatively inexpensive, readily available stream of mixed hydrocarbons between about 10 and about 20 carbon atoms in length, such as No. 2 Fuel Oil, on a single pass through the extractor. Thereafter, the solvent stream containing the contaminants is combusted to produce useful thermal energy, e.g., steam or the like, as in a suitable boiler, by combustion at a temperature and under conditions under which it is guaranteed that at least about 99.9% of the extracted organic contaminants are destroyed by oxidation. It is found that particular efficiency results from the use of a mixed hydrocarbon stream that is primarily aliphatic and that has a flash point of greater than about 100° F., such as No. 2 Fuel Oil, which minimizes the danger of explosion, especially when this extraction is carried out in combination with a steam generation process for the creation of electrical power, some of which is used in driving the electric motors and powering other components of the countercurrent extraction apparatus.

BRIEF DESCRIPTION OF THE DRAWING

The FIGURE shows a schematic system for carrying out a process embodying various features of the invention including the use of a mixed hydrocarbon solvent in a one-pass countercurrent extraction unit which is coupled to an oil-fired, steam-generating boiler that supplies steam to a steam turbine connected to a generator which generates electrical power.

DETAILED DESCRIPTION OF THE PREFERRED EMBODIMENTS

Disclosed schematically in the drawing is a system for treating wastewater to remove relatively substantial concentrations or even trace levels of hazardous dissolved organic compounds in a particularly efficient and economical manner. As a result of such treatment, the wastewater is rendered acceptable for discharge to a municipal treatment plant or for discharge to the environment, as to a river or other body of water, to a landfill or to a deep well or the like. Although the system is illustrated as in connection with the treatment of a wastewater stream, it may also be used for treating process water streams to permit recycling and reuse of the water in an industrial process following the removal of particular contaminants.

Very generally, a stream of organic-pollutant, contaminated wastewater is extracted via countercurrent flow with a substantially immiscible stream of mixed hydrocarbons having a density substantially less than that of water in a manner to yield a concentrated pollutant-laden organic stream which is then combusted under controlled conditions, including a temperature sufficiently high to assure thermal destruction by oxidation of at least 99.9% of the pollutants extracted from the wastewater stream, while generating useful thermal energy, e.g., steam for process heat or for use in the creation of electrical energy. More specifically, the system employs a once-through extraction flow of the mixed hydrocarbon solvent stream without any recycle thereof, and particular advantages of the overall coupled system are derived from the selection of a mixed hydrocarbon stream having a relatively high partition coefficient for pollutants commonly being extracted, having a relatively low cost, having a very low danger of creating an explosive mixture so as to negate the need for protective equipment which can be expensive to install and maintain and having particularly suitable characteristics for generating useful thermal energy, e.g., high BTU content, i.e., at least about 10,000 BTU per gallon.

Very generally, it is found that the employment of certain mixed hydrocarbon streams have overall characteristics such that they can be efficiently and economically used in a once-through countercurrent extraction system to remove dissolved, organic pollutants from aqueous streams and then efficiently be combusted to effectively destroy such pollutants by oxidation while simultaneously producing useful thermal energy, e.g., for power-generation or process heat. More particularly, a stream of mixed hydrocarbons having carbon chain lengths between about $C_{10}$ and $C_{20}$, and preferably between about $C_{10}$ and $C_{16}$, have sufficiently high partition coefficients, for pollutants commonly of interest with respect to water, that they can be used as part of such a once-through process. By $C_{10}$ hydrocarbon is meant an aliphatic hydrocarbon of straight or branched chain configuration including 10 carbon atoms in the chain, e.g., n-decane. Because of its high partition coefficient, such a hydrocarbon stream can be employed at a relatively low flow rate, relative to the flow rate of the wastewater stream, in a countercurrent extractor to produce a combustible stream having a significant concentration of organic pollutants. As a consequence and in view of its relatively low cost, the solvent is rendered feasible for use in such a once-through extraction process; and moreover, the ability to then efficiently employ this combustible product stream for the prompt creation of useful thermal energy adds significantly to the overall efficiency and economics. By negating the need for storing substantial quantities of the contaminated solvent and the need to clean-up the solvent for reuse, which usually includes some cost for makeup solvent, substantial cost savings result. Moreover, the character of this solvent is such that it can be combusted under conditions that will assure thermal destruction of the contaminants while simultaneously efficiently generating useful thermal energy, as for example, the creation of steam in a boiler for electrical power generation or the creation of process heat, as in an industrial furnace, in a cement kiln or in an incinerator for the burning of moisture-laden waste.

The mixed hydrocarbon stream should be relatively low in its aromatic content and, in this respect, should have an aromatic content of not greater than 15% by weight, with lower aromatic contents, for example, 10% or less, being preferred. More particularly, the aromatics contained should preferably not be more than sparingly water-soluble. In addition, the system should be operated under conditions, with respect to the relative flow rates in the countercurrent extractor, that the departing aqueous raffinate stream should not contain aromatic hydrocarbons in an amount greater than about 5 ppm. In this respect, if the wastewater or process water stream being treated should contain a substantial amount of aromatic hydrocarbons, it may be necessary to employ a solvent stream particularly low in its aromatic content. Moreover, the hydrocarbon stream should be closely selected for volatility and flash point so as to have a vapor pressure of preferably not greater than about 1 millimeter of mercury at 20° C. and to have a flash point greater than 100° F. The foregoing characteristics minimize the danger of the potential creation of explosive vaporous mixtures at the various locations throughout the overall system, thus adding to the economies by obviating the need to positively protect against such potentially explosive buildups. The preferred mixed hydrocarbon stream is one having a 90%-point distillation temperature between about 500° F. and about 640° F., meaning that 90% of the hydrocarbon mixture will distill from the mixture at atmospheric pressure at a temperature somewhere within the 100° F. range beginning at 540° F., with the remaining 10% being vaporizable either in the upper part of the range or at a higher temperature.

The most preferred solvent is No. 2 Fuel Oil, having an aromatic content of between about 8 weight percent and about 10 weight percent. It was surprisingly found that No. 2 Fuel Oil, which is a mixture of substantially entirely nonpolar hydrocarbons, would have such a relatively high partition coefficient that it would partition away from an aqueous stream highly polar organic compounds including halogenated aliphatic and aromatic compounds, and that even polar phthalate compounds and ketones could be effectively extracted. It was indeed surprising that the blend of aliphatic hydrocarbons in No. 2 Fuel Oil was capable of accomplishing such extractions at favorable flow rates, relative to the flow of the wastewater stream, in a once-through countercurrent extraction process. Such a once-through process assures that the cleanest raffinate is exiting following contact with fresh solvent and has a significant advantage over an extraction process wherein recirculation of the solvent stream is used so that the cleanest raffinate will have been in contact with a somewhat contaminated solvent stream which inherently reduces the relative extraction effect that results.

The state of the art of countercurrent extractor design using baffles and, if required, mechanical agitators, is such that excellent contact can be achieved between two immiscible liquids of substantially different densities in a single stage without undesirable emulsification. Moreover, emulsification is deterred by operating at a neutral pH and by elimination of particulates above about 10 microns in size. Therefore, although treatment may be carried out at a pH between 2 and 12, there are advantages from operating at a pH between about 5 and about 9, and accordingly, the pH is preferably maintained in this range. In treatment of the usual wastewater streams, acidic conditions are more likely to be encountered than highly basic conditions, and such can be neutralized by adding or injecting appropriate amounts of inorganic or organic bases or neutral buffering agents that are environmentally acceptable.

The relatively high partition coefficients (discussed in detail hereinafter) allow the countercurrent extraction to be carried out at a solvent stream to a water stream ratio of less than 1:5 and in many instances at ratios of about 1:20 or even as low as 1:100. In a once-through process, such a ratio is quite favorable in conserving the use of the solvent which is not recycled, and it therefore allows the process to be economically used to treat wastewater streams containing only trace amounts of water-soluble organic pollutants. On the other hand, the total amount of solvent employed may not, in many instances, render the overall process non-cost-competitive because the hydrocarbon stream, following its use for extraction, is used in the second part of the overall, process to create useful thermal energy, while simultaneously assuring the adequate destruction by oxidation of the extracted organic pollutants.

The ability of the solvent stream to adequately be employed, using existing technology, to create useful thermal energy, remains a criterion for its original selection. In this respect, No. 2 Fuel Oil is particularly well qualified, because of its high heat content, for use in a boiler to generate steam, as well in industrial furnaces and kilns, and even in incinerators for burning moisture-laden waste materials, which incinerators can, in turn, be operated as auxiliary sources of heat energy.

It is believed that the overall solvent extraction process is potentially applicable to a wide variety of toxic industrial wastewaters and is feasible for the cleanup of wastewaters containing wide concentration ranges, down to a few parts per million (ppm), of pollutants, such as pesticides, halogenated aliphatic hydrocarbons, aromatic hydrocarbons, chlorinated aromatic hydrocarbons, ketones, phenols, chlorinated phenols and nitroaromatic compounds, which although sometimes only sparingly soluble in water can pose health hazards. The process is also considered valuable to treat streams having substantially higher concentrations, for example, contamination levels of 1 or 2 weight %. Such wastewaters are often created by manufacturers of chemicals and electronic components; they are also generated by most solvent-reclamation facilities, which also must meet standards set by the Environmental Protection Agency (EPA) in the United States. In general, federal land disposal restrictions have become more stringent in recent years, and the standards that have been set for discharge to municipal wastewater treatment systems are frequently so stringent that they may require less than 1 ppm of total organic halides—standards which are extremely difficult to reach by conventional treatment methods. Thus, although it is presumed that the process will generally be operated to reduce the total amount of dissolved organic pollutants to a level not greater than about 10 ppm, there are some pollutants, e.g., PCBs, for which removal to about 1 ppm or less will be required.

The equilibrium partition coefficient (Kp) has been developed as a measure of the distribution coefficient of a particular compound in two substantially immiscible liquid phases and may be defined as: $Kp = Y/X$ where: Y equals concentration of the pollutant in the solvent phase and X equals the concentration of the pollutant in the aqueous phase from which removal is to be effected. The relationship is valid for solvent and water streams which are in substantial equilibrium within a contact stage within an extractor or the like. The following Table lists equilibrium partition coefficients which have been experimentally determined for solvent/pollutant-/water systems by laboratory testing using standard No. 2 Fuel Oil as the solvent.

TABLE I

| Pollutant | Partition Coefficient (Kp) |
|---|---|
| Halogenated Aliphatics | |
| Chloroform | 86 |
| 1,2-Dichloroethane | 24 |
| 1,1-Dichloroethene | 280 |
| Carbon Tetrachloride | 3300 |
| 1,2-Dichloropropane | 160 |
| Trichloroethene | 740 |
| Bromoform | 310 |
| Tetrachloroethene | 10 |
| 1,1,2,2-Tetrachloroethene | 240 |
| 1,1,1-Trichloroethane | 860 |
| Halogenated Aromatics | |
| Chlorobenzene | 570 |
| 1,2-Dichlorobenzene | 1450 |
| Ketones | |
| 2-Butanone (MEK) | 10 |
| Methyl-2-Pentanone (MIBK) | 15 |
| Phenols | |
| Phenol | 30 |
| 2-Chlorophenol | 97 |
| 1-Methylphenol (o-Cresol) | 26 |
| 4-Chloro-3-Methylphenol | 79 |
| 4-Nitrophenol | 8000 |
| 4,6-Dinitro-2-Methylphenol | 32 |
| Pentachlorophenol | 1800 |
| Miscellaneous Aromatics | |
| Benzene | 81 |
| Toluene | 190 |
| Nitrobenzene | 290 |
| Naphthalene | 580 |
| 2,4-Dinitrotoluene | 560 |
| Dimethyl Phthalate | 100 |
| Diethylphthalate | 860 |
| 4-Nitroanaline | 440 |

As a part of the tests made to determine the foregoing partition coefficients, tests were also made as to the potential presence of contaminants in the aqueous raffinates following the extraction, which contaminants would be a result of transfer from the solvent (No. 2 Fuel Oil) to the aqueous phase in the extractor. As a result of the substantial testing, only two fuel-oil-originated compounds were identified in the raffinate, namely, 2-methylnaphthalene and phenanthrene/anthracene. These two compounds were both present at a concentration less than about 0.1 ppm, placing them below any known existing standard for pretreatment prior to discharge to a municipal treatment facility. Thus, it can be seen that No. 2 Fuel Oil exhibits excellent high partition coefficients for a wide variety of organic, partially water-soluble pollutants likely to be encountered, particularly chloroethanes, chlorophenols, nitroaromatics, aromatic hydrocarbons and chlorobenzenes. The extraction process is generally operated so as to remove at least about 95% of the dissolved organic pollutants originally present; often it is feasible to operate so as to remove 98% or more which is preferred. Of course, the selection of the mixed hydrocarbon stream to be used as the solvent is dependent upon the specific organic pollutants carried by the particular wastewater or process water stream to be treated and other mixed hydrocarbons between $C_{10}$ and $C_{20}$ chain length may be chosen depending upon a favorable partition coefficient they might exhibit for a particularly critical organic pollutant.

As generally hereinbefore indicated, the once-through solvent extraction step isolates toxic organic pollutants in an organic liquid matrix of a character chosen to be particularly useful as fuel for a boiler, a furnace or kiln, a waste-burning incinerator or the like. As a part of the operation of the coupled thermal-energy-generating system, efficient thermal destruction of the extracted organic pollutants is carried so as to assure destruction of at least 99.9% of the pollutants. To assure the desired destruction is obtained so that there will be no significant air discharge of potentially toxic chemical compounds, combustion is carried out under appropriately controlled conditions, namely, a combustion zone temperature of at least about 1000° F. and preferably at least about 1500° F., and with an adequate oxygen supply. In this respect, heated air is preferably supplied to the combustion chamber in an amount equal to the stoichiometric amount needed for complete combustion plus an excess of about 3%; for example, air may be supplied at a rate of at least about 70 cubic feet per minute, measured at standard temperature and pressure (0° C. and 1 atm.), for each gallon of No. 2 Fuel Oil which is being combusted. Preferably the air is heated to a temperature of at least about 500° F., and when higher combustion temperatures are being used, the air is most preferably preheated to at least about 1000° F.

By operating the wastewater or process water treatment system in coupled arrangement with a facility for producing useful thermal energy, particular economies are achieved, which economies are maximized when the thermal energy generating facility is one which is particularly designed to burn No. 2 Fuel Oil or the like. In such an instance, assuming that the thermal energy generating installation is reasonably efficient in stand-alone operation, the coupling of the two systems can be viewed as providing essentially a free source of solvent for the countercurrent solvent extraction system. However, it is not necessary that the combustor be one that is designed specifically to employ No. 2 Fuel Oil; for example, it could be designed to burn particulate coal in a fluidized bed or even natural gas, with No. 2 Fuel Oil being supplied as an ancillary fuel, as is often done. As earlier indicated, the useful thermal energy can be the creation of steam in saturated or superheated form for expansion through a turbine and the subsequent creation of electrical energy; alternatively, the steam, or some other heat transfer fluid, can be used to supply process heat to an industrial process. The solvent stream carrying the extracted pollutants can be also burned in a heat-treating furnace or an industrial kiln or furnace, such as a cement kiln or a furnace which utilizes more of the radiant heat from the combustion. Another possibility is the burning of moisture-containing waste, such as municipal garbage, in an incinerator where the combustion of the fuel oil provides the primary source of heat to raise the waste material to its combustion temperature.

As previously indicated, the overall process is also considered valuable because of its ability to extract several dissolved organic pollutants that may be present in relatively substantial amounts, e.g., about 50-100 ppm each, or in only trace amounts. In this respect, the overall process is considered to be particularly valuable when the aqueous stream being treated contains two or more halogenated hydrocarbons, and it may be economically used when individual concentrations of such particular pollutants are as low as 1 or 2 ppm. Of course, it is even more economically feasible to employ the process when higher levels of contaminants are present, and it should be understood that the conditions of the countercurrent extraction can be adjusted so as to effectively treat aqueous streams containing as high as about 100,000 ppm of total contaminants (assuming they would be sufficiently soluble to be dissolved at such levels) although, at extremely high levels, it may be desirable to use more than one stage of treatment, as is known in the art of countercurrent extraction generally. For example, the system could be advantageously used by a solid waste reclamation facility that operates a business in respect of the treatment and disposal of organic pollutant-contaminated aqueous mixtures wherein the wide applicability of the mixed hydrocarbon solvent becomes a very significant advantage.

Illustrated schematically in the drawing is an example of an overall installation embodying the various features of the invention that is intended to illustrate a potential commercial application of the invention. However, it should be understood that the description of the installation is illustrative only and is not restrictive of the scope of the invention which is defined by the claims which appear at the end of this specification.

For purposes of illustration, an installation 11 depicted in the drawing is one that might be operated at an industrial chemical manufacturing/formulating facility that regularly generates about 50,000 gallons per day of organic-contaminated wastewaters from various process sources, including process waste streams, product wash streams, rainwater runoff and the like. Such a facility might presently dispose of such wastewater via on-site deep well injection; however, impending state and federal prohibitions upon deep well injection of solvent and toxic organic-contaminated waste streams will likely place severe restraints upon the characteristics of wastewater streams for which deep well injection will be permitted in the near future. For example, the wastewater streams in question may be assumed to contain a total concentration of about 600 ppm of the following organic, partially water-soluble contaminants: benzene, nitroaromatics, chloroethanes and chlorobenzenes.

The wastewater streams from the various sources in the facility are aggregated in a wastewater storage unit 13 which may be a large storage tank or the like. A composite wastewater stream containing about 600 ppm of organic contaminants is pumped from the tank 13 by a pump 15 through a preconditioning filter 16 which removes any solid materials contained in the stream, generally down to a size as low as about 0.01 mm., the removal of which solids deters potential emulsification in the countercurrent extractor. The pH of the pumped stream may then be monitored for pH using a pH meter 18 which is linked to an overall control system 27, before it flows through an upper side inlet 20 into a countercurrent extractor 21 of continuous, high capacity design which promotes maximum contact efficiency and minimum emulsification between the contaminated aqueous wastewater stream and a solvent stream. Should the pH monitored begin to deviate from the neutral toward the acidic, the control system 27 is programmed to cause an inorganic base, such as NaOH or a suitable buffering agent, to be suitably added to the stream as by an injector 19 to maintain the pH between about 5 and 7.

A stream of mixed hydrocarbons, specifically No. 2 Fuel Oil, is pumped from a solvent storage tank 23 by a pump 25 controlled by the overall control system 27 which also controls the pump 15. The pumped stream of No. 2 Fuel Oil enters a lower side inlet 29 of the continuous extractor, and its immiscibility with water and its lower density than that of water causes it to rise in the extractor while the water stream continuously descends. The extractor design includes baffles and agitators which assure maximum contact efficiency between the two countercurrently flowing streams while minimizing any emulsification effect; as such, it is particularly adapted to continuous operation with the relative flow rates of the two streams being controlled through the control system 27 as more specifically discussed hereinafter. However, in general, the No. 2 Fuel Oil solvent is pumped into the extractor 21 at a flow rate equal to about 10% of the flow rate of the contaminated wastewater stream.

Because of the inherent nature of such a single stage, continuous, high capacity countercurrent extractor, complete separation of the two phases may not be feasible at the discharge ports from the extractor 21, and accordingly, auxiliary settling tanks may be provided to assure achieving the desired and adequate phase separation. More specifically, the rising solvent stream exits from the extractor through a top outlet 33 and flows through a conduit 35 into a settling tank or dewatering unit 37, which it enters through a side inlet 39 preferably located at a vertical level near the vertical midpoint of liquid body in the settling tank, i.e., preferably within a vertical distance not more than about 10% of the depth of the liquid. The settling tank 37 is of a sufficient size to permit substantially complete separation of the two phases, with the solvent phase exiting the tank through an upper outlet 41 and the heavier aqueous phase exiting through a bottom outlet 43.

The descending aqueous phase, which has been effectively stripped of its organic contaminants by the extraction capability of the No. 2 Fuel Oil solvent, exits the continuous countercurrent extractor 21 through a bottom outlet 53 and flows through a conduit 55 leading to a settling tank or decanter 57 which it enters through a central side inlet 59, that is similarly located as indicated with respect to the inlet 39 on the dewatering unit. A substantially complete phase separation takes place in the decanter 57, similar to that described above, and the lighter solvent phase exits through an upper outlet 61 whereas the more dense aqueous phase exits through a lower outlet 63. The separated solvent stream from the exit 61 is pumped via a pump 65 to the conduit 35 leading to the dewatering unit, and if desired, a surge tank (not shown) can be included. The aqueous stream exiting from the lower outlet 43 of the dewatering unit 37 is pumped via a suitable pump 67 to the conduit 55 leading to the decanter 57, and likewise, if desired, a surge tank (not shown) can be included in the piping assembly.

The main flow from the decanter is, of course, out through the lower outlet 63 where the raffinate from the extractor, following final phase separation in the decanter, is directed either to appropriate disposal or to reuse, for which it has been rendered acceptable as a result of the extraction of toxic organic contaminants, either substantially completely removing such contaminants, or reducing their levels below the maximum allowable concentrations for discharge to the environment or to a municipal treatment plant or, alternatively, reducing them to levels that meet the criteria set industrially for the facility itself to permit reuse of the aqueous stream therewithin. In the illustrated embodiment, the discharge from the decanter 57 through the outlet 63 may be permitted to flow to a pump 71 which directs it to a municipal treatment plant 75 having the capacity to accept such discharge, where it will usually be biologically further treated to produce a totally environmentally acceptable effluent. Alternatively, the discharge can be pumped via pump 75 to a deep well injection installation 77 that may be maintained on site. In this respect, the pumps 71 and 75 may be controlled by the control system 27 to direct all of the discharge to either the municipal treatment plant 73 or to the deep well injection installation 77 or to split the flow between the two. Further in this respect, a monitoring system 81 can be associated with the discharge from the decanter 57 whereby continuous monitoring for particular organic contaminants can be carried out, with signals from the monitoring device that are indicative of changes in the amounts of specific pollutants that are detected being fed to the control system 27. As a result of such monitoring, the control system can effect various changes appropriate thereto. For example, the control system 27 might slightly increase the rate at which the No. 2 Fuel Oil is pumped to the continuous extractor so as to, in this respect, achieve a higher extraction of certain contaminants. The monitoring system 81 can also be used to proportion the discharge flow between the municipal treatment plant and the deep well injection installation, and alternatively, should the level of a particular contaminant being monitored momentarily arise above the maximum permissible amount acceptable for discharge to the municipal treatment plant, it may be possible to completely divert the discharge flow to the deep well injection installation until adjustments are made to the extraction installation to reduce the level of the contaminant in question to its maximum permissible concentration or below.

The solvent stream discharge through the upper outlet 41 from the dewatering unit 37 flows through a conduit 83 leading to a pump 85 which directs it to a conventional fuel oil burner 87 mounted in a boiler 89. If desired, a surge tank (not shown) can be included in the piping arrangement. Heated air is supplied to the combustion section of the boiler through a conduit 91 preferably driven by a blower 93 which takes its suction from a heat exchanger or a recuperator 95 through which the stack gases from the boiler pass prior to being exhausted into the atmosphere. The boiler 89 is operated so that the combustion temperature is maintained at between about 1500° F. and 2000° F. in the combustion zone, and preferably at about 1900° F. or above. The extraction of 50,000 gallons per day of the specified wastewater generates about 5,000 gallons per day of pollutant-bearing No. 2 Fuel Oil. Assuming operation for 24 hours each day, this results in a flow to the burner 87 from the pump 85 at a rate of about 210 gallons per hour. Heated air is fed by the blower 93 at a temperature of 500° F. and a flow rate of about 245 cubic feet per minute, which results in a residence time of about 2 seconds in the combustion zone where oxidation occurs. On the premise that the amount of contaminant-containing solvent might not be sufficient to provide the needed total thermal energy, in this instance steam, provision is made to provide an auxiliary fuel, for example, fuel oil or natural gas, through a conduit 97 leading to the combustion section of the boiler.

Feed water for the boiler is supplied through the line 101 which incorporates a feed water pump 103, and the water is turned to steam within the usual array of piping (not shown) disposed within an upper section of the boiler 89. The steam, which may be saturated or superheated, exits the boiler through a line 105 and is delivered to a combination steam turbine-electrical generator 107 of conventional design, wherein the steam is expanded through the turbine section driving the rotary generator and creating electrical power which is supplied through transmission lines 109 to a power grid 111. The power grid is interconnected to the facility to provide electrical power for the various motors which drive the motors for the pumps, blowers or the like, run the control systems, and otherwise light and operate the facility. Excess power that is generated above the needs of the facility itself is sold to the local electrical utility. The expanded steam from the turbine section is directed to a condenser 117 where it is condensed to water by air or water coolant or the like, which coolant enters through an inlet 119 and exits via the outlet 121. The water flows through a condensate line 123 to the feed water pump 103, and again a surge tank (not shown) can be employed.

Overall, the illustrated combined system has very substantial economies, and assuming the generation of electrical power using such a steam boiler or combustor is reasonably economical, by coupling it with the wastewater treatment process, one nearly obtains the extraction solvent free of charge for use in the contamination removal section of the installation. Moreover, should the facility require a greater amount of electrical power than is being generated at any particular time via the steam produced by the combustion of the entire hydrocarbon stream from the dewatering unit 37, the control system 27 can be programmed to increase the flow of No. 2 Fuel Oil, within certain limits, that is fed by the pump 25 through the extractor 21. In such an instance, the excess amount of fuel oil needed for power generation can be used to even further reduce residual contaminants in the treated wastewater raffinate. On the other hand, should there be excess power being generated over that needed by the facility (which would be automatically sold to an electrical utility through a state-of-the-art type interconnection), this condition might also be monitored by the control system 27, and when such a condition exists, if the monitoring device 81 which is measuring contaminant levels in the effluent line from the decanter discharge 63 also shows values well below the target levels, it could be programmed to decrease the flow rate of solvent being supplied by the pump 25 so as not to expend more solvent than is needed in the wastewater cleanup system. Thus, it can be seen that the overall system is extremely flexible and offers very substantial economies of operation, as well as the capacity for being able to decontaminate aqueous streams having multiple dissolved toxic organic pollutants.

Although the invention has been illustrated with regard to a preferred embodiment and depicts the best mode presently contemplated by the inventors for carrying out the invention, it should be understood that various changes and modifications as would be obvious to one having the ordinary skill in this art may be made without departing from the scope of the invention, which is defined in the claims appended hereto. For example, although it is preferred to be able to use the pollutant-bearing mixed hydrocarbon stream on-site to create the useful thermal energy, particularly because such on-site use allows feedback and continuous adjustment between the two coupled systems while eliminating storage of substantial quantities of pollutant-bearing solvents, it is possible to pump or otherwise transport the pollutant-bearing fuel oil to an off-site industrial furnace, kiln, waste incinerator or the like where it would be combusted to provide thermal energy under closely controlled conditions to assure that at least about 99.9% of the toxic organic pollutants extracted from the wastewater stream are destroyed by oxidation.

Particular features of the invention are emphasized in the claims that follow.

What is claimed is:

1. A method suitable for the extraction from a contaminated water stream of a wide variety of dissolved organic pollutants to render such stream suitable for reuse or for discharge to the environment or to another treatment method for removing different contaminants, which method comprises the steps of pretreating a first stream of contaminated water to remove suspended solids therefrom, contacting said pretreated first stream of contaminated water with a countercurrent second stream of substantially water-immiscible, non-polar mixed hydrocarbons of chain lengths between about $C_{10}$ and $C_{20}$ which second stream extracts particular dissolved organic pollutants of interest and removes same from said first stream to create a treated water stream which meets environmental standards for re-use or for discharge to a municipal treatment facility or to the environment and which contains less than 10 ppm total of dissolved organic pollutants;

separating a treated water stream containing not more than 10 ppm of dissolved organic pollutants of concern and a contaminated mixed hydrocarbon stream from said countercurrent contacting step;

transferring said contaminated mixed hydrocarbon stream to a power or heat-generating facility and burning said stream and its contaminants at a temperature of at least about 1000° F. and a residence time of at least about 1 second; and either directing said treated stream for re-use, or discharging said treated water stream to the environment or to a subsequent treatment facility.

2. A method according to claim 1 wherein said contaminated stream contains at least two of the following dissolved organic pollutants: chloroethanes, chlorophenols, nitroaromatics, aromatic hydrocarbons and chlorobenzenes.

3. A method according to claim 2 wherein said treated stream contains said dissolved organic pollutants in amounts not greater than about 1 ppm each.

4. A method according to claim 1 wherein said burning step is effected under conditions to achieve greater than 99.9% destruction of organic pollutants.

5. A method according to claim 1 wherein suspended solid particulates greater than about 10 microns in size are removed from said water stream by filtration prior to said contacting step and wherein said countercurrent treatment is carried out at a second stream to water stream ratio of less than 1:5.

6. A method according to claim 1 wherein said hydrocarbons have chain lengths between about $C_{10}$ and $C_{16}$ and said second stream is subjected to said burning step after a single pass through said countercurrent contacting step.

7. A method according to claim 1 wherein the pH of said first stream entering said contacting step is maintained between about 5 and about 9.

8. A method according to claim 1 wherein aromatic content of said second stream material is such that said treated water stream contains an amount of aromatic hydrocarbons not greater than about 5 ppm.

9. A method according to claim 1 wherein said second stream is No. 2 Fuel Oil.

10. A method according to claim 9 wherein said countercurrent treatment is carried out at a water stream to second stream ratio of between about 5 and about 100 to 1.

11. A method according to claim 1 wherein said second stream is primarily aliphatic, having an aromatic content of not greater than about 15% by weight.

12. A method according to claim 1 wherein said second stream has a flash point of greater than about 100° F.

13. A method according to claim 1 wherein said second stream has a vapor pressure of not greater than about one mm. of Hg at 20° C.

14. A method according to claim 1 wherein said second stream is a hydrocarbon mixture having a 90% point distillation temperature between about 540° F. and about 640° F.

15. A method according to claim 1 wherein said first stream contains dissolved halogenated organic pollutants and at least about 95% of said dissolved halogenated organics are removed from said first stream.

16. A method for economically creating useful thermal energy by combusting a contaminated solvent stream obtained from extraction treatment of a contaminated water stream containing dissolved organic pollutants which treatment renders such water stream suitable for reuse or for discharge to the environment or to another treatment method for removing different contaminants, which method comprises the steps of
   pretreating a first stream of contaminated water to remove suspended solids therefrom,
   contacting said pretreated first stream of contaminated water with a countercurrent second stream of substantially water-immiscible, non-polar mixed hydrocarbons of chain lengths between about $C_{10}$ and $C_{20}$ which second stream in a single pass extracts particular dissolved organic pollutants of interest and removes same from said first stream to create a treated water stream which meets environmental standards for re-use or for discharge to a municipal treatment facility or to the environment and which contains less than 10 ppm total of dissolved organic pollutants;
   separating a treated water stream containing not more than 10 ppm of dissolved organic pollutants of concern and a contaminated mixed hydrocarbon stream from said countercurrent contacting step;
   transferring said contaminated mixed hydrocarbon stream following said single pass through said countercurrent contacting step to an on-site power or heat-generating facility and burning said stream and its contaminants at a temperature of at least about 1000° F. and a residence time of at least about 1 second;
   monitoring to detect specific contaminant levels of dissolved organic pollutants in said treated water stream and adjusting the relative rate of flow of said second stream entering said countercurrent contacting step responsive to the levels detected; and
   either directing said treated stream for re-use, or discharging said treated water stream to the environment or to a subsequent treatment facility.

17. A method according to claim 16 wherein said countercurrent treatment is carried out at a second stream to water stream ratio of less than 1:5.

18. A method according to claim 16 wherein said second stream is primarily alphatic hydrocarbons, having an aromatic hydrocarbon content of not greater than about 10% by weight.

19. A method according to claim 16 wherein steam is created by said burning second stream, wherein said steam is expanded through a turbine to create electrical power via an interconnected electrical generator and wherein said electrical power is used to operate said contacting, separating and monitoring steps.

* * * * *

UNITED STATES PATENT AND TRADEMARK OFFICE
CERTIFICATE OF CORRECTION

PATENT NO. : 4,948,511
DATED : August 14, 1990
INVENTOR(S) : Gregory R. Swanson et al.

It is certified that error appears in the above-identified patent and that said Letters Patent is hereby corrected as shown below:

IN THE ABSTRACT:

Line 8, correct the spelling of "hydrocarbons".

Column 5, delete the comma at the end of line 20.

IN THE CLAIMS:

Claim 9, line 1, delete the comma.

Claim 12, line 2, change "10020" to --$100°$--.

Signed and Sealed this

Thirty-first Day of December, 1991

Attest:

HARRY F. MANBECK, JR.

*Attesting Officer*   *Commissioner of Patents and Trademarks*